United States Patent [19]

Naudet

[11] Patent Number: 4,595,339
[45] Date of Patent: Jun. 17, 1986

[54] CENTRIPETAL ACCELERATOR FOR AIR EXHAUSTION IN A COOLING DEVICE OF A GAS TURBINE COMBINED WITH THE COMPRESSOR DISC

[75] Inventor: Jacky Naudet, Bondoufle, France

[73] Assignee: Societe Nationale d'Etude et de Construction de Meteurs d'Aviation S.N.E.C.M.A., Paris, France

[21] Appl. No.: 647,635

[22] Filed: Sep. 6, 1984

[30] Foreign Application Priority Data

Sep. 21, 1983 [FR] France .................. 83 14975

[51] Int. Cl.$^4$ .............................................. F01D 5/08
[52] U.S. Cl. ........................................... 416/95; 415/115; 415/139; 415/144; 415/208; 416/90 R; 60/726
[58] Field of Search ................ 416/95, 90 R, 93 R; 415/115, 144, 139, 120, 208; 60/39.75, 726

[56] References Cited

U.S. PATENT DOCUMENTS

| | | | |
|---|---|---|---|
| 2,603,453 | 7/1952 | Sollinger | 415/115 |
| 2,641,440 | 6/1953 | Williams | 416/90 |
| 3,742,706 | 7/1973 | Klompas | 416/95 |
| 3,982,852 | 9/1976 | Andersen et al. | 416/95 |
| 4,178,129 | 12/1979 | Jenkinson | 416/95 |
| 4,415,310 | 11/1983 | Bouiller et al. | 416/95 |

FOREIGN PATENT DOCUMENTS

| | | | |
|---|---|---|---|
| 49126 | 8/1940 | Netherlands | 416/95 |
| 267499 | 6/1950 | Switzerland . | |
| 492869 | 8/1970 | Switzerland . | |
| 584580 | 1/1947 | United Kingdom | 416/95 |
| 617472 | 2/1949 | United Kingdom | 416/95 |
| 712051 | 7/1954 | United Kingdom . | |
| 1318256 | 5/1973 | United Kingdom | 416/95 |

Primary Examiner—Robert E. Garrett
Assistant Examiner—H. Edward Li
Attorney, Agent, or Firm—Oblon, Fisher, Spivak, McClelland & Maier

[57] ABSTRACT

A compressor disc assembly with an integral centripetal accelerator for the exhaustion of air for use in a cooling device of a gas turbine, the bleeding of air at the surface of the compressor drum being effected by orifices situated in the platforms of the blades and in the median plane of the compressor disc. The assembly is formed from two half discs. The centripetal accelerator includes several sectors detachably mounted in the space defined between the two half discs of the compressor, each sector being formed from two half shells having on their internal face ribs in the form of centripetal blades by which the half shells are assembled together. The invention is utilized for cooling a gas turbine by bleeding air from the compressor.

3 Claims, 3 Drawing Figures

CENTRIPETAL ACCELERATOR FOR AIR EXHAUSTION IN A COOLING DEVICE OF A GAS TURBINE COMBINED WITH THE COMPRESSOR DISC

BACKGROUND OF THE INVENTION

1. Field of the Invention

The present invention relates to a compressor disc with an integral centripetal accelerator for air exhaustion in a cooling device of a gas turbine.

2. Discussion of the Background

In gas turbine engines for cooling the interior of the rotor of the high pressure compressor, the cooling air destined for the discs and blades of the turbine is, in general, bled from the main flow of the compressor through an opening provided in the drum of the compressor and is then directed to the turbine through the interior of the drum.

The provision of openings in the annular members forming the drums is inconvenient in that it introduces bending stresses which limit the permissible value of the maximum radius of the annular members of the drum.

This restriction on the diameter of the annular members of the drum has an adverse effect on the technology of the elements of the main air flow and on the effectiveness of the cooling. As regards the technology of the elements of the main air flow, this restriction in the diameter of the annular members of the drum implies an impossibility of employing hammer-head roots which are less costly than the broached roots. The hammer-head roots are in practice of a greater mass than those of the broached roots and the centrifugal force which they exert on the rim of a compressor disc in two parts would tend to cause separation of the two half discs. The possiblity of placing the annular members of the drum as high as possible allows effective bracing of the discs to counter separation of the half discs. As regards cooling, the size of the surrounding dead space gives rise to re-circulation flows which disturb the discharge of cooling air.

In order to overcome these problems, a cooling device of a gas turbine is proposed as shown in French Pat. No. 8021454, in which cooling device the cooling air of the turbine is bled in the plane of the disc carrying the compressor blades by orifices situated at the platforms of the blades.

The reduction of the bending stresses which follows enables the displacement outwardly of connections of the drum onto the disc to a radial zone adjacent the rim; this arrangement being particularly advantageous for increasing the strength of discs made up of two half discs welded at the rim and allows the use of blades with heavier hammer-head roots, but which are less expensive than conventional broached-root blades. The increase in the radial stress applied to the disc is adequately absorbed by the latter because of the radial position of the annular bracing members forming the drum. However, in order to improve the effectiveness of the bleed, the half discs are provided internally, in order to accelerate the discharge, with centripetal blading.

However, it has been shown during trials that the presence of blades or fins on the interior of each half disc introduces asymmetrical centrifugal forces which tend to produce, in turn, deformities in the half discs and even risk causing, in time, fracture of the disc in the weld zone of the rim.

SUMMARY OF THE INVENTION

One object of the present invention is to overcome the problems arising from the constructions used in prior proposals.

According to the present invention there is provided in a compressor disc assembly, a first half disc, a second half disc secured to the first half disc and together defining a space having orifices at the rim for bleeding air, and a centripetal accelerator device detachably mounted within said space of the half discs and communicating with the orifices, the device comprising a plurality of sectors mounted as an annular array within said space, each sector having a first half shell, a second half shell and ribs on the half shells which form centripetal blades and which serve to assemble the half shells together.

This arrangement allows an improvement in the efficiency of the bleeding of the air by guidance to the exit from the compressor.

The use of non-integral blading on the faces of the disc allows the use of smooth internal faces of the half discs wherein the two faces are effectively symmetric and the centrifugal stresses are balanced.

Moreover, machining of half discs is simpler and less expensive.

The compressor disc with integral centripetal accelerator provides a gain in mass in comparison with prior art arrangements. Finally, the arrangement adopted allows ready control of the quality of the welding at the rim.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
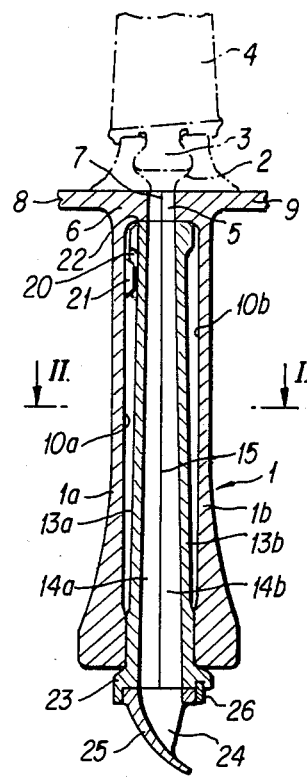
FIG. 1 is a radial cross sectional view of one half of a compressor disc in accordance with the invention provided with a centripetal accelerator.
Figure 2:
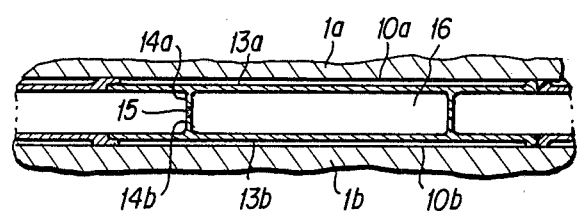
FIG. 2 is a sectional view taken on line II—II of FIG. 1.

In FIGS. 1 and 2, there is shown a compressor disc 1 of a gas turbine engine which has, at its periphery, a channel 2 in which are engaged the hammer-headed roots 3 of the blades 4.

Air bleeding is effected in the plane of the disc 1 from the orifices 5 (FIGS. 1 and 3) provided in the blade platforms 4.

The compressor disc 1 is made up of two half discs 1a, 1b substantially symmetrical on each side (FIG. 1) which are welded together along line 7 in a known manner at the rim 6, which is extended by annular flanges 8, 9 which are finally welded together to form the drum.

Within the space defined by the internal faces 10a, 10b of the half discs, a centripetal accelerator is arranged which comprises several sectors 11a, 11b, 11c, 11d the generally radial boundaries of which are defined by edges 12.

These sectors are detachably mounted within the space defined between the two half discs of the compressor and each sector 11a, 11b is defined by two half shells 13a, 13b having on their inner faces ribs 14a, 14b which form centripetal blades. The half shells 13a, 13b forming a sector are assembled and welded along line 15 by diffusion along the whole length of each of the ribs 14a, 14b.

In this manner, the centripetal blades 14 are defined in the interior of the sectors 11a, 11b, 11c, 11d, which blades delimit between themselves generally radial passages 16 for cooling air emerging from the orifices 5 and flowing out through the central portion 17 of the compressor.

Figure 3:
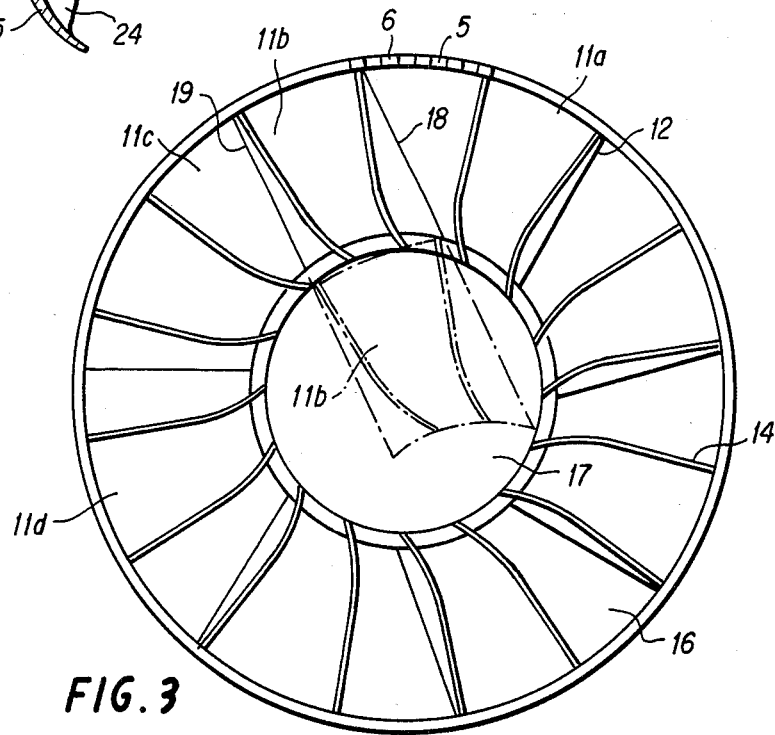
FIG. 3 is a sectional view on the median plane of the compressor disc in accordance with the invention provided with a centripetal accelerator.

To enable their mounting, the sectors 11a, 11b, 11c, 11d which are eight in number and, in the case of FIG. 3, do not all have the same generally trapezoidal form. The neighbouring sectors 11a and 11c are shaped so as to make up together, once assembled, two parallel edges 18, 19, such that the sector 11b mounted last provides a construction with two parallel edges to enable sliding between the parallel edges 18, 19 of the sectors 11a, 11c.

To ensure circumferential locking of the sectors 11a, 11b, 11c, 11d, each comprises a radial rib 20 situated on the outer face of one of the half shells 13a and which is engaged, on mounting, between two parallel radial ribs 21 situated on the inner face 10a of the half disc 1a.

However, the sectors 11a, 11b, 11c, 11d engage at their outer edges 22 with the internal face of the rim 6 of the disc 1, so that the radial passages 16 are located relative to the orifices 5 for entry of air. The internal edge 23 of the sectors 11a, 11b, 11c, 11d receive a body of revolution 24 of which one portion 25 comprises an extension orientated downstream and forming a deflector which guides the air to the exit of the disc 1 and prevents it from striking the shaft. The body of revolution 24 is maintained in place by a locking member 26 on the sector.

This arrangment improves the effectiveness of the bleeding of the air. In practice, the air is guided from its exit at the rim of the disc 1, whilst, in the arrangement forming the subject of French Pat. No. 8021454, it passed initially into a chamber which was made necessary by the welding operation.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A compressor disc assembly, comprising: p1 a first half disc;
   - a second half disc secured to the first half disc and which in combination define a space having orifices at a rim portion thereof for bleeding air;
   - a centripetal accelerator device detachably mounted within said space of the half discs and communicating with the orifices, wherein said device further comprises
   - a plurality of sectors mounted in an annular array within said space, wherein each of said sectors includes a first half shell, a second half shell and a plurality of ribs located on the half shells which respectively form a plurality of centripetal blades and which serve to connect the half shells together and wherein each of said sectors are substantially of a trapezoidal form;
   - a locking member attached to each of said sectors; and
   - a body of revolution including a deflector engaged with said locking member for discharging air towards an exit of said centripetal accelerator, wherein radial inner edges of said sectors respectively receive said deflector and wherein said sectors have generally radial edges, the angles of at least some of which, relative to a radial line extending from a center of said disc assembly, differing from one another.

2. A compressor disc assembly according to claim 1, wherein said disc further comprises a rim and wherein each of said sectors engages at an outer edge thereof an interior surface of said rim of the disc, wherein inlet portions of passages formed between the centripetal blades coincide with said orifices.

3. A compressor disc assembly according to claim 1 wherein each of said sectors further comprises a radial rib located on an outer face and on an outer edge thereof and wherein inner faces of the half discs of the compressor have first and second radial ribs for engaging the radial rib of each of said sectors.

* * * * *